Aug. 8, 1950
G. DEAKIN
2,517,546
RECIPROCATING DRIVE MECHANISM FOR AUTOMATIC
SELECTORS AND SIMILAR DEVICES
Filed Feb. 19, 1946
4 Sheets-Sheet 1
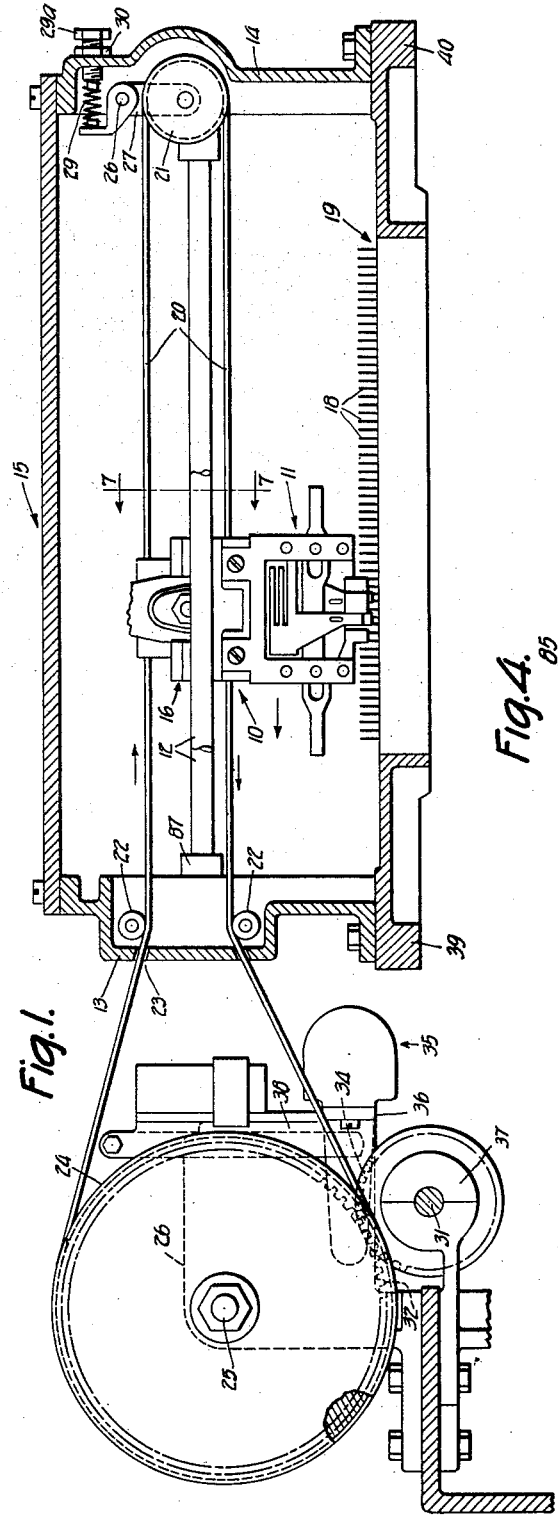
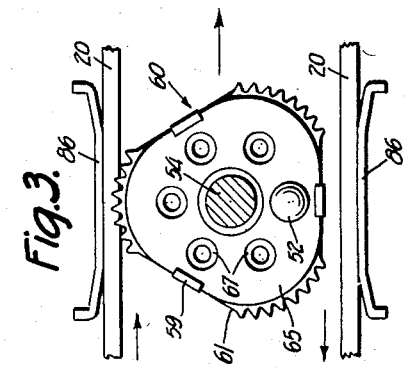
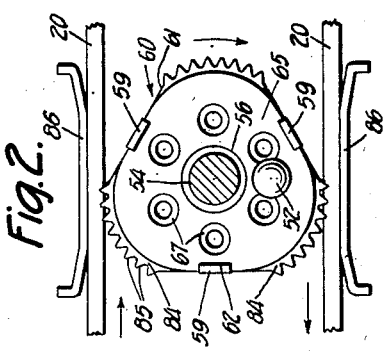
INVENTOR.
Gerald Deakin
BY Robert Harding Jr.
ATTORNEY INVENTOR.
Gerald Deakin BY Robert Harding Jr.
ATTORNEY Aug. 8, 1950     G. DEAKIN     2,517,546
RECIPROCATING DRIVE MECHANISM FOR AUTOMATIC
SELECTORS AND SIMILAR DEVICES
Filed Feb. 19, 1946     4 Sheets-Sheet 3
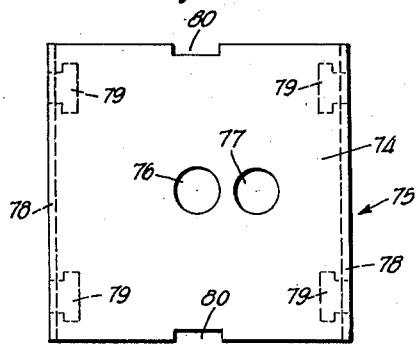
Fig. 9.
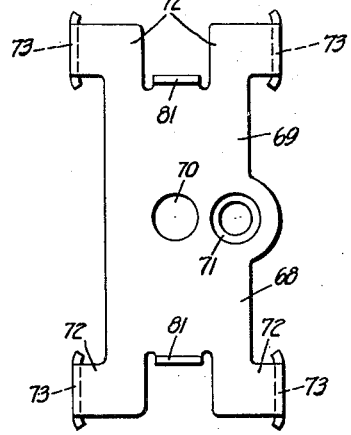
Fig. 11.
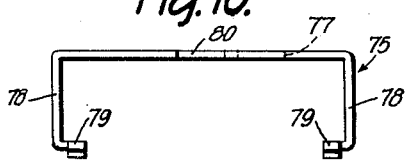
Fig. 10.
Fig. 12.
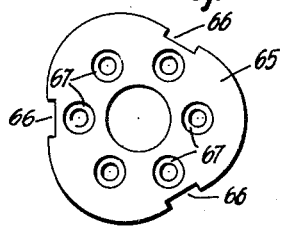
Fig. 13.
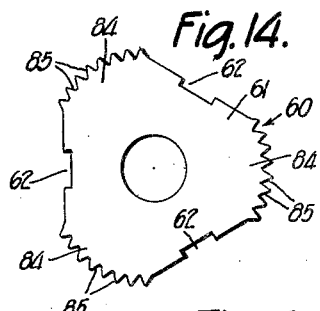
Fig. 14.
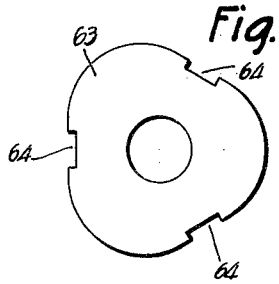
Fig. 15.
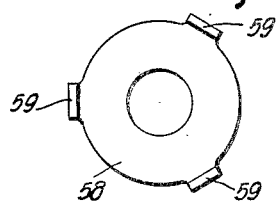
Fig. 16.
INVENTOR.
Gerald Deakin
BY *Robert Harding Jr.*
ATTORNEY Aug. 8, 1950                   G. DEAKIN              2,517,546
RECIPROCATING DRIVE MECHANISM FOR AUTOMATIC
SELECTORS AND SIMILAR DEVICES
Filed Feb. 19, 1946                                            4 Sheets-Sheet 4
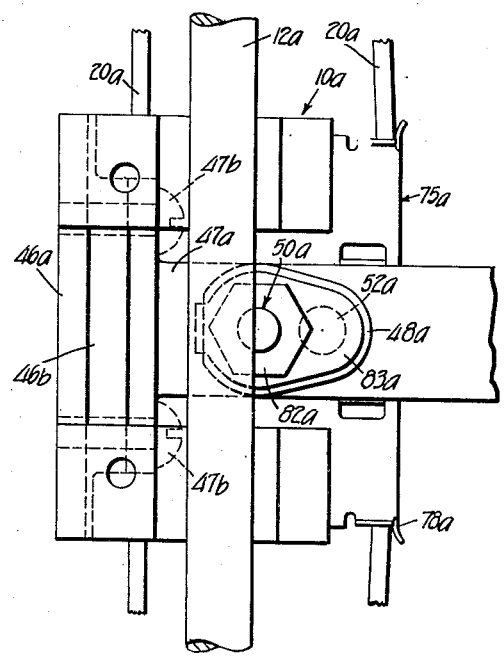
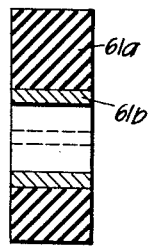
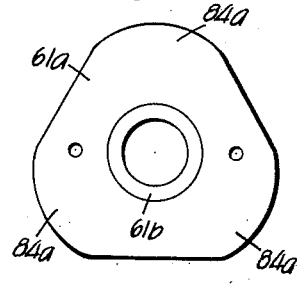
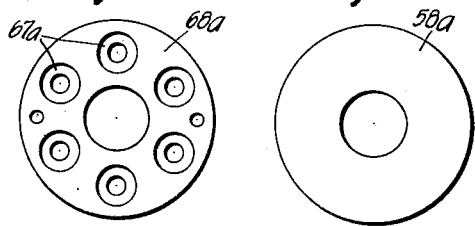
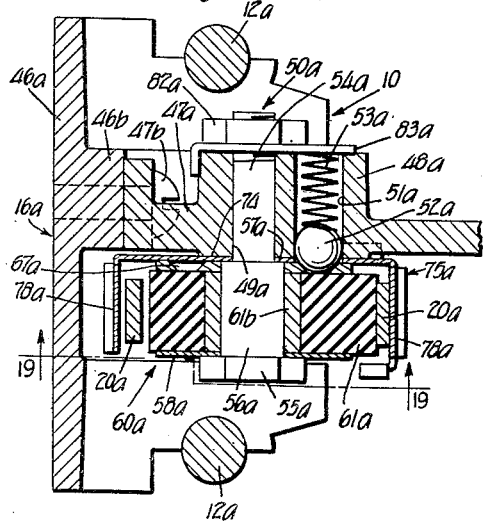
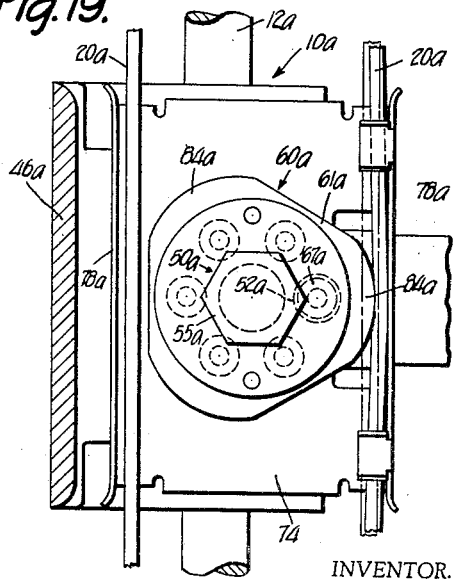
INVENTOR.
Gerald Deakin
BY Robert Harding jr.
ATTORNEY Patented Aug. 8, 1950

2,517,546

UNITED STATES PATENT OFFICE 2,517,546

RECIPROCATING DRIVE MECHANISM FOR AUTOMATIC SELECTORS AND SIMILAR DEVICES

Gerald Deakin, New York, N. Y., assignor to International Standard Electric Corporation, New York, N. Y., a corporation of Delaware Application February 19, 1946, Serial No. 648,760

6 Claims. (Cl. 74—37)

1

The present invention relates to means for driving reciprocatory carriages such as brush carriages of selector switches, for example switches of this character used in automatic telephone systems as finder switches, group selectors, final connectors, marking switches or the like.

Furthermore, the invention relates to driving means of the character wherein the reciprocatory carriage is connected alternately to parallel, oppositely moving reaches of an endless belt moving in one direction during each period of operation. More particularly the invention relates to driving means of said character wherein the connecting means includes a rotatable clutch member and the change from one reach to the other is effected by step-by-step movement of the said rotatable clutch member due to the continuous movement of the belt when the movement of the carriage is arrested.

This invention is claimed broadly in my copending application Ser. No. 648,759, filed February 19, 1946, and which issued as Patent No. 2,510,084 June 6, 1950.

An object is to provide for a reciprocatory brush carriage or the like, a flat-belt drive of the endless or continuous belt type which is novel and advantageous in construction and operation, which is easy to assemble and economical to manufacture, and which will operate satisfactorily over long periods of service with a minimum of attention.

Another object of the invention is a novel and advantageous reciprocatory carriage drive which is of simple construction and which will operate quietly and positively.

Another object is to provide for a reciprocatory carriage a novel and advantageous endless belt drive wherein the belt is flat and the means for grasping alternately two parallel reaches of the belt acts yieldably on said belt.

Another object is to provide for a reciprocatory carriage a novel and advantageous endless belt drive wherein there is a rotatable member having three toothed grasping devices equally spaced therearound and effective one at a time to press the belt against a resilient support; and checking of the carriage while the belt continues to move starts rotation of said rotatable member to start release of the effective grasping device and engagement of the other reach by the grasping device in advance thereof, the two grasping devices working together until the first is released and the second is fully engaged.

A further object of the invention is to provide for a reciprocatory carriage, an endless belt drive

2 including a clutch having toothed engaging portions and which will work equally well for either direction of drive for the belt, in coupling the carriage alternately to two parallel reaches of the belt.

Other objects, features and advantages will appear upon consideration of the following detailed description and of the drawings in which, Fig. 1 is a fragmentary section as seen from above, illustrating an embodiment of the present invention;

Fig. 2 is a fragmentary diagrammatic view illustrating the rotatable clutch device engaging both reaches of the flat belt but about to release the upper reach and to complete the clutching of the other reach.

Fig. 3 is a view similar to Fig. 2 but with the transfer of the clutching action to the outer reach of the belt completed;

Fig. 4 is a fragmentary view on a larger scale showing the rounded ends of the teeth of each rotatable clutch member;

Fig. 9 is a top plan view of the sheet metal clutch support with downturned flanges at two opposite locations to support the reaches of the belt against pressure by the rotatable clutch device;

Fig. 10 is an end view of the structure of Fig. 9;

Fig. 11 is a back plate which interlocks with the clutch support;

Fig. 12 is an end view of the structure of Fig. 11;

Fig. 13 is a top plan view of an end member of the rotatable clutch device;

Fig. 14 is a top plan view of one of the toothed clutching disks;

Fig. 15 is a top plan view of the filler between two toothed clutching disks; and Fig. 16 is a top plan view of the dished clamp engaging the lower toothed disk and having fingers extending upwardly through aligning recesses in the other members of the rotatable clutching device.

Fig. 17 is a view on a larger scale of another embodiment of the clutching means in the central part of Fig. 1;

Fig. 18 is a section taken on the line 18—18 of Fig. 17;

Fig. 19 is a section taken on the line 19—19 of Fig. 18;

Fig. 20 is a section through another embodiment of the clutching disk;

Fig. 21 is a top plan view of the clutching disks shown in Fig. 20;

Fig. 22 is a top plan view of a disk forming part of the clutching device; and

Fig. 23 is a top plan view of disks arranged adjacent to the clutch disk.

Figure 5:
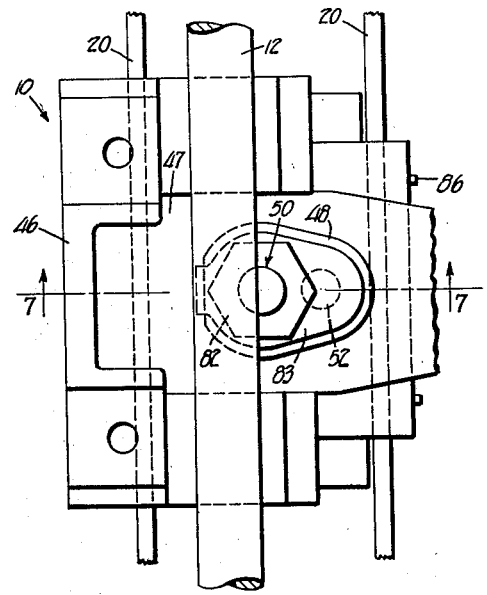
Fig. 5 is a view on a larger scale of the clutch means in the central part of Fig. 1.
Figure 6:
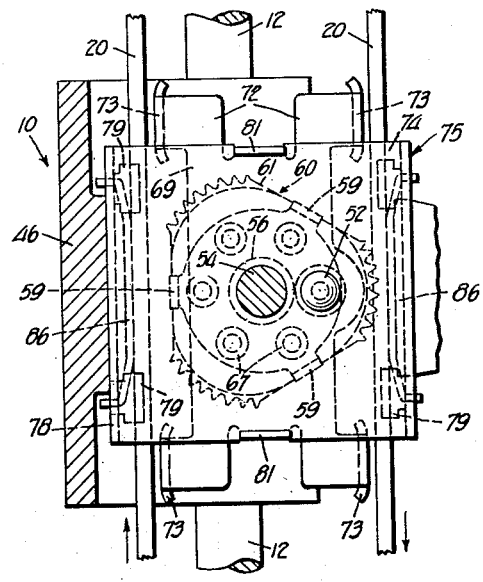
Fig. 6 is a section taken along the line 6—6 of Fig. 7.
Figure 7:
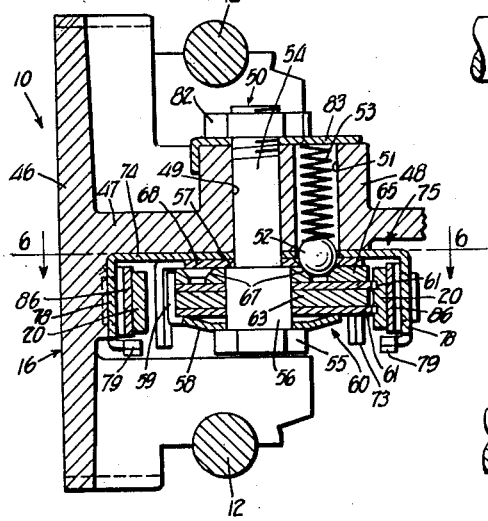
Fig. 7 is a section taken on the line 7—7 of Fig. 5.
Figure 8:
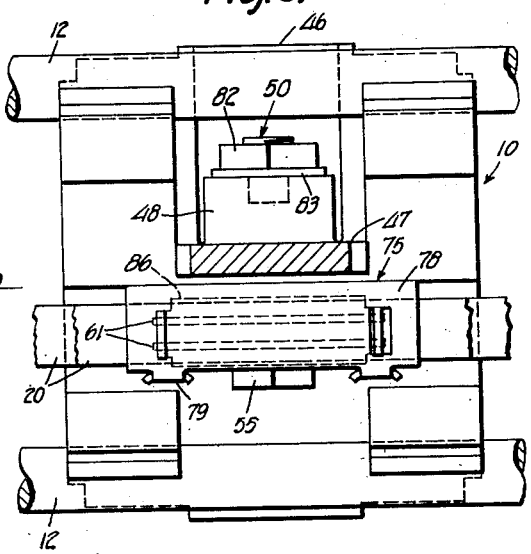
Fig. 8 is a view looking at Fig. 7 from the right.

Referring more particularly to Figs. 1, 7 and 8, a frame 10 of a brush carriage 11 is mounted to slide along two fixed horizontal guides or rods 12 (Figs. 7 and 8). Said guides or guide rods 12 are secured at their ends to frame members 13 and 14 which may form part of a casing 15 in which the brush carriage 11 is reciprocated.

Said brush carriage 11 carries brush means to cooperate with terminals 18 of a flat terminal bank 19. No part of the present invention is involved in the brush unit and the flat terminal bank. In said frame 10 is a support 16 for belt-gripping means for alternately connecting the brush carriage to two parallel reaches of an endless belt 20 which is driven in one direction only.

As illustrated in Fig. 1, the endless belt 20 passes around a pulley 21 at the right end (Fig. 1) of the casing 15. From said pulley 21 extend parallel runs or reaches which at the other end of the casing pass between two guide rollers or pulleys 22 and then diverge through openings 23 in said frame or casing member 13 to the outside of the casing. Outside of the casing 15, the belt 20 passes around a large driving pulley or wheel 24, fixed on a short or stub shaft 25 journalled in a bracket 26 constituting part of the frame of the assembled apparatus. The belt may be kept taut by pivotally mounting the pulley 21 on a frame 27 pivoted at 28 and urged in the proper direction by means of a compression spring 29 and a screw 29a for adjusting the tension of the spring. The screw may be held in adjusted position by means of a lock nut 30.

The pulley 24 around which the belt 20 passes is driven by suitable clutch mechanism from a vertical shaft 31 which is motor driven in a manner that is well known in so-called rotary telephone exchange systems. For example, this clutch mechanism is similar to clutch mechanisms already in use and comprises a thin flexible gear 32 fixed to the lower end of stub shaft 33.

A gear 34 is secured on shaft 31 to rotate therewith and to mesh with flexible gear 32 which may, however, be flexed to disconnect it from gear 34. Gear 34 may be in the form of a thin disk and may be mounted between stiffener disks (not shown). The clutch is controlled by a clutch magnet 35 mounted on a flange or bracket 26 with its pivoted armature 36 at the bottom thereof. An arm 37 extends from the armature to a point beneath the flexible gear 32 near the point of engagement of the two gears, and when moved upwardly by a suitable spring 38 will flex gear 32 out of mesh with gear 34. Upon energization of the magnet e. g. as a result of starting a call or dialing, the armature arm 37 will be swung downwardly against the action of the spring 38 and the flexible gear 32 will mesh with driving gear 34, thus causing movement of belt 20 and reciprocation of the brush carriage, the brushes acting under control of usual brush spreaders.

The flat terminal bank 19 is mounted between vertical frame elements 39 and 40 to which casing ends 13 and 14, respectively, are secured. Other banks 19 may be mounted above or below the bank shown in Fig. 1, and by merely turning the banks, the brush carriages and the driving means of a unit upside down, all of these parts could be used on the opposite side of the bay. If the gear 34 were used to drive a unit on the side of the bay opposite to that shown to be in use in Fig. 1; the pulley 24 would be below the associated flexible gear 32 and the corresponding banks 19 at opposite sides of the bay would be at different levels.

The structure thus far described is similar to structure descibed and claimed in my copending application Ser. No. 648,759, filed February 19, 1946. However, the endless belt in said copending application is round whereas in the instant application the belt is flat and the grooves in the peripheries of pulleys 21, 22 and 24 are shaped to accommodate said flat belt 20.

According to the present invention, the clutch support 16 constitutes part of a novel and advantageous device for alternately gripping parallel reaches of the endless flat belt 20 and causing the brush carriage to be reciprocated. The gripping device is especially adapted to act on a belt of flat cross-section.

The frame 10 comprises a stiff inner plate 46 with projections providing downwardly facing half bearings engaging the lower guide 12 and upwardly facing half bearings engaging the upper guide 12 (Fig. 7). A horizontal flange 47 projects from the plate 46 intermediate its upper and lower edges and this flange is provided with an upwardly projecting barrel 48 to accommodate a vertical cylindrical bore 49 to receive the threaded shank of a bolt 50 to secure to said flange 47 a clutch support 16; and to provide a bore 51 to accommodate a ball 52 and a spring 53 of a ball detent. The bolt 50 has a threaded shank 54, a head 55 and adjacent said head a cylindrical spacing portion or spacer 56 which is of greater diameter than said shank and provides a shoulder 57.

Resting on said head 55 and fitting on said cylindrical spacer 56 is a dished disk 58 having upwardly extending fingers 59. Above said disk 58 and resting thereon is a rotatable clutch device 60 which comprises a lower clutch disk 61 (Fig. 14) having notches 62 to receive said fingers 59, an upper clutch disk 61, and a spacer 63 between said disks and provided with notches 64, to receive said fingers 59.

Above said upper clutch disk 61 is a cover disk 65 also provided with notches 66 to receive said fingers 59 and having in addition six frusto-conical passages 67 to receive the lower portion of the ball 52 in accordance with the various positions of the rotatable clutch device 60. Above the cover disk 63 is a back frame 68 comprising a plate 69 with a hole 70 to fit over the shank 54 with the plate resting against said shoulder 57. The plate 69 also has a tapered opening 71 to receive part of said ball 52. At the end of said plate there are side extensions 72 with downturned ends 73 at the inner sides of the reaches of the belt to keep them spaced apart.

Resting on said plate 69 is a plate 74 of a frame 75. In said plate is an opening 76 to receive said shank 54 and an opening 77 to receive said ball 52. Flanges 78 extending downwardly at the side edges of plate 74 support the reaches of the belt 20 against outward pressure.

The parts mounted on bolt 50 can be removed from the frame merely by removing the unit 82 and withdrawing it from the apparatus. This operation may be reversed in assembling the parts of the machine.

With the apparatus in operation Fig. 1 and with the brush carriage attached to a reach of the belt moving toward the left (Fig. 1), the travel of the carriage will continue until it strikes a buffer 87. Then the pull of the lower reach will cause the rotary clutch device 60 to turn clockwise first to the position shown in Fig. 2. Before the teeth are raised from the lower reach, a set of teeth at the front of the rotatable device will engage the upper reach. Then the rotatable device will be turned by both reaches of the belt and finally the upper reach will serve to drive the brush-carrying device, and downward displacement of the reaches of the belt is guarded against by fingers 79 extending inwardly from the lower edges of said flanges. In the ends of the plate 74 are recesses 80 to receive fingers 81 projecting upwardly from plate 69. By means of a nut 82 threaded on shank 54, the plates 69 and 74 are firmly clamped against flange 47, leaving other parts to turn freely on cylindrical part 56.

The spring 53 of the ball detent is held under compression by a washer 83 which covers the upper end of bore 51. Said washer 83 fits over the upper end of said shank 54 and is clamped in position by nut 82.

Each clutch disk 61 has three equal toothed lobes or projections 84 between said notches 62. The teeth 85 of each projection are in an arc of a circle of a radius which is substantially less than the distance from the teeth to the center of said disk. The sets of teeth are highest at the middle thereof and the disks can therefore be used for either direction of movement of the belt. Said teeth 85 have rounded ends as clearly shown in Fig. 4, thus reducing wear on the belt.

The toothed disks exert an unyielding outward pressure on the belt when the toothed portions engage the same. To relieve this condition the supporting flanges 78 are provided with inwardly arched springs 86 to give yielding support to the reaches of the belt. Each of these springs has inturned ends entering slots in said supporting flanges.

The belt 20 may be made of textile strands woven or braided in the desired shape and impregnated with suitable material, for example a plastic such as neoprene. Although the belt has been described as flat, it will be evident that so long as the inner side of the belt is flat the outer side may be shaped otherwise.

When one of said toothed projections is in clutching engagement with the belt 20 the teeth are forced into the belt to some extent and effect a strong connection between the carriage and the belt. This connection is supplemented by frictional engagement between a gripped portion of the belt and the belt-backing supports on the carriage.

The operation is as follows: In Fig. 1 the carriage 11 is being drawn to the left by the lower or inner reach of the belt 20. At the left end of its path, the carriage will be stopped by engagement with stop 87. However, the belt continues its movement and the pull of the lower reach will overpower the detent means and turn the rotatable clutch device or element 60 in a clockwise direction and move the toothed projection in advance thereof into engagement with the upper reach. Then the rotatable device will be turned by the pull of both reaches until the lower set of teeth (Fig. 2) moves out of engagement with the lower reach. As soon as the upper set of teeth reaches its full engagement position the ball detent will become effective and the carriage will move to the right. When the carriage reaches the right end of its path the rotatable member 60 will be given another 60° turn and the carriage will move to the left.

In Figs. 17 through 23 there is shown a still further simplified form of clover leaf clutch for a flat belt, or a belt with a flat inner face wherein the clover leaf or rotatable clutch element may be compressed as well as or instead of the belt or the belt support which may be called a back stop. For example, the body of the clover leaf may be made of normally soft, elastic material, for example, normally soft neoprene. A rotatable clutch device of this character would provide a strong connection between the carriage and the belt, either with or without the detent means.

As illustrated, there is mounted on two parallel guides or rods 12a, a carriage 10a adapted to carry a brush unit. This carriage comprises a central plate 46a having a projection 46b on which is secured by screws 47b a member 47a carrying the clutch. The member 47a is provided with an upwardly extending barrel 48a to accommodate a vertical cylindrical bore 49a to receive the threaded shank of a bolt 50a to secure to said member 47a a clutch support 16a and to provide a bore 51a to accommodate a spring 53a and a detent ball 52a. The bolt 50a has a threaded shank 54a, a head 55a and adjacent said head a cylindrical spacing portion or spacer of greater diameter than said shank and provides a shoulder 57a.

Resting on said head 55a and fitting on said cylindrical spacer is a disk 58a on which rests a clutch member 61a of yieldable elastic material such as neoprene on a bushing or sleeve 61b which fits on spacer 56a. The clutch member has three uniformly spaced clutching projections 84a with lower portions therebetween. Above said clutch member 61a is a disk 68a having six frusto-conical openings 67a to receive ball 52a. The parts 58a, 61a and 68a may be secured together by rivets 61c.

Above said shoulder 57a is a base plate 74 of the frame 16a which has downwardly extending flanges 78a constituting belt supports or back stops, the one at the right (Fig. 18) being shown with belt supporting fingers 79a. The spring 53a of the ball detent is held under compression by a washer 83a which fits over the upper end of shank 54a. When the nut 82a is tightened the frame 16a is clamped between shoulder 57a and member 47a.

With the exception of the action of the rotatable clutching element on the belt, the operation of the clutch of the second form of the device is substantially the same as for the first form. The toothed-belt-engaging portions of the rotatable clutching element of the first form serve to provide a strong hold on the flat inner surface of the belt but at the same time the belt is subjected to greater pressure where engaged by the rounded ends of the teeth. The clover leaf of the second form has compressible elastic belt-engaging portions of material such as normally soft neoprene. These compressible portions tend to flatten out along the belt and have a strong hold on the belt due to the frictional engagement therebetween.

Both disclosed forms of the invention are especially adapted for use with flat belts or belts with flat inner surfaces. However, both forms might be adapted for use with other forms of belts.

It should be understood that certain changes may be made and that certain features may be used without others, without departing from the true scope and spirit of the invention.

What I claim is:

1. In a reciprocating drive mechanism, a reciprocatory carriage, rectilinear guiding means therefor, a horizontally extending endless flat driving belt therefor driven in one direction and having oppositely driven parallel reaches parallel to said guiding means, and clutching means on said carriage including belt supports outside of said reaches, a pivot midway between said reaches and perpendicular to the plane thereof, said pivot being in the form of a bolt having a head and an upwardly extending part comprising a cylinder adjacent said head and a reduced threaded shank, a rotatable clutch element on said cylinder comprising a plurality of disks with spacing means therebetween and having three sets of teeth arranged therearound at uniform intervals, a dished member on said cylinder having fingers projecting upwardly between said sets of teeth and through notches in said spacing means, a washer over the upper toothed disk and having notches to receive said fingers.

2. The combination according to claim 1 wherein detent means are provided for holding said rotatable device against said reaches by means on the carriage.

3. The combination according to claim 1 wherein said reaches are yieldably supported against outward movement by means on said carriage.

4. The combination according to claim 1 wherein each of said belt supports comprises an inwardly sprung spring extending along the corresponding reach and connected at its ends to said carriage.

5. The combination according to claim 1, wherein there are two parallel rows of teeth in each set.

6. The combination according to claim 1 wherein the teeth are on coaxial disks and the teeth in each set are arranged in parallel rows corresponding to the individual disks.

GERALD DEAKIN.

REFERENCES CITED

The following references are of record in the file of this patent:

UNITED STATES PATENTS

| Number | Name | Date |
| --- | --- | --- |
| 1,774,356 | Cloud | Aug. 26, 1930 |
| 2,197,501 | Holden | Apr. 16, 1940 |
| 2,412,079 | Brustowsky | Dec. 3, 1946 |